(12) United States Patent
Kano et al.

(10) Patent No.: US 10,811,685 B2
(45) Date of Patent: Oct. 20, 2020

(54) NEGATIVE ELECTRODE ACTIVE MATERIAL AND ELECTROCHEMICAL DEVICE

(71) Applicant: Panasonic Intellectual Property Management Co., Ltd., Osaka (JP)

(72) Inventors: Akira Kano, Osaka (JP); Kazuko Asano, Osaka (JP); Tsuyoshi Ichinose, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/814,571

(22) Filed: Nov. 16, 2017

(65) Prior Publication Data

US 2018/0183063 A1 Jun. 28, 2018

(30) Foreign Application Priority Data

Dec. 26, 2016 (JP) .................................. 2016-250333

(51) Int. Cl.
*H01M 4/58* (2010.01)
*H01M 10/052* (2010.01)
*H01M 10/0525* (2010.01)
*H01M 4/02* (2006.01)

(52) U.S. Cl.
CPC ....... *H01M 4/5825* (2013.01); *H01M 10/052* (2013.01); *H01M 10/0525* (2013.01); *H01M 2004/021* (2013.01); *H01M 2004/027* (2013.01)

(58) Field of Classification Search
CPC .................................................. H01M 4/5825
See application file for complete search history.

(56) References Cited

U.S. PATENT DOCUMENTS

| 2005/0281727 | A1* | 12/2005 | Yoshizawa | .......... | C01B 21/0821 423/385 |
| 2010/0297504 | A1* | 11/2010 | Oki | .......... | H01M 4/58 429/231.95 |
| 2011/0305949 | A1* | 12/2011 | Nesper | .......... | H01M 10/052 429/211 |

FOREIGN PATENT DOCUMENTS

JP 2011-222521 11/2011

* cited by examiner

*Primary Examiner* — Stephan J Essex
(74) *Attorney, Agent, or Firm* — McDermott Will & Emery LLP

(57) ABSTRACT

A negative electrode active material contains a lithium-containing transition metal oxynitride having a crystal structure belonging to the space group Fm3m. An electrochemical device includes a negative electrode which contains a negative electrode active material containing a lithium-containing transition metal oxynitride having a crystal structure belonging to the space group Fm3m; a positive electrode; and an electrolyte.

7 Claims, 2 Drawing Sheets

NEGATIVE ELECTRODE ACTIVE MATERIAL AND ELECTROCHEMICAL DEVICE

BACKGROUND

1. Technical Field

The present disclosure relates to a negative electrode active material for an electrochemical device and an electrochemical device.

2. Description of the Related Art

Japanese Unexamined Patent Application Publication No. 2011-222521 discloses an electrode containing a transition metal oxynitride represented by $Li_xTl_mTll_nN_yO_z$ (wherein x=0 to 3, y+z=2 to 4, y>0, z≥0.25, m+n=1, m=0 to 1, n=0 to 1, and Tl and Tll are both transition metals in Group IVB, VB, VIB, and VIIB or 3d, 4d, and 5d periods).

SUMMARY

In the related art, it is desired to realize a negative electrode active material and an electrochemical device each having a high discharge capacity density.

In one general aspect, the techniques here feature a negative electrode active material containing a lithium-containing transition metal oxynitride having a crystal structure belonging to the space group Fm3m.

According to the present disclosure, it is possible to realize a negative electrode active material and an electrochemical device each having a high discharge capacity density.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
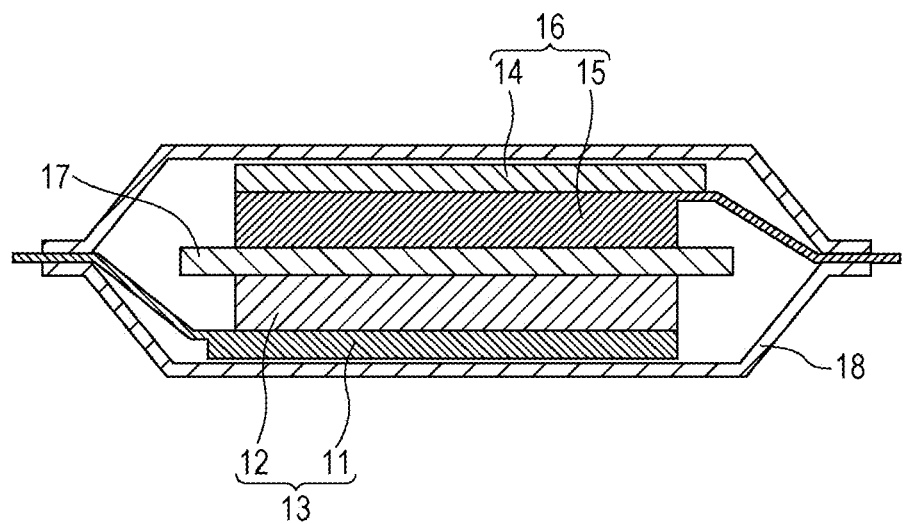
FIG. 1 is a sectional view showing a schematic configuration of a battery as an example of a battery according to a second embodiment of the present disclosure.

Embodiments of the present disclosure are described below.

First Embodiment

In a first embodiment, a negative electrode active material contains a lithium-containing transition metal oxynitride having a crystal structure belonging to the space group Fm3m.

This configuration can realize an electrochemical device (for example, a battery or a capacitor) using the negative electrode active material having a high discharge capacity density. That is, an electrochemical device (for example, a battery or a capacitor) having a high discharge capacity density can be realized.

The negative electrode active material according to the first embodiment is characterized by its crystal structure and by containing lithium, a transition metal element, oxygen, and nitrogen in a compound. The inventors investigated the structure of a lithium-containing transition metal oxynitride, the composition ratio between lithium, a transition metal element, oxygen, and nitrogen, and reactivity between the lithium-containing transition metal oxynitride and lithium ions. As a result, it was found that a higher discharge capacity density than usual can be achieved by using a negative electrode active material which has a crystal structure belonging to the space group Fm3m and which contains lithium, a transition metal element, oxygen, and nitrogen in a compound.

The reason for this is considered, for example, as follows.

When the crystal structure is not a rock salt-type structure belonging to the space group Fm3m, lithium, a transition metal element, oxygen, and nitrogen are regularly arranged in the structure. Therefore, the amount of lithium ions which can be occluded during charging/discharging is limited. Thus, the amount of lithium ions occluded is decreased.

While when the crystal structure of the negative electrode active material belongs to the space group Fm3m, lithium, a transition metal element, oxygen, and nitrogen are randomly arranged in the structure. Therefore, the lithium sites moving in the structure during charging/discharging are not limited. Thus, a larger amount lithium ions can be occluded.

When the elements contained are only lithium, a transition element, and oxygen, a main reaction potential for lithium ion occlusion/release becomes as high as 2 V or more versus $Li^+/Li$. The usable reaction potential range of a negative electrode is about 2 V or less versus $Li^+/Li$. Therefore, when the elements contained are only lithium, a transition element, and oxygen, a negative electrode active material having a high discharge capacity density cannot be produced.

On the other hand, the hybrid orbitals of nitrogen and a transition metal lie at higher energy than the hybrid orbitals of oxygen and a transition metal. Therefore, when nitrogen is contained in addition to lithium, a transition metal element, and oxygen, the electron energy of a transition metal is as a whole shifted to the high-energy side as compared with the case of only oxygen. Thus, the main reaction potential for lithium ion occlusion/release can be decreased. Thus, a negative electrode active material having a high discharge capacity density within the usable reaction potential range of a negative electrode can be produced.

In the negative electrode active material according to the first embodiment, the lithium-containing transition metal oxynitride may be a compound represented by the following composition formula (1).

$$Li_xMeO_yN_z \qquad \text{Formula (1)}$$

In the formula, Me is at least one metal selected from the group consisting of transition metals.

In addition, the following conditions are satisfied.

$0 < x \leq 7$ $0.5 \leq y \leq 2$ $0 < z \leq 1.5$ $1 \leq y+z \leq 3$

The above configuration can realize an electrochemical device (for example, a battery or a capacitor) having a higher discharge capacity density.

When "x≤7" is satisfied in the negative electrode active material according to the first embodiment, the discharge capacity density of the negative electrode active material can be increased.

While when "x>7", for example, the true density of the negative electrode active material is excessively decreased. Therefore, the discharge capacity density is decreased.

Also, when "0.5≤y" is satisfied in the negative electrode active material according to the first embodiment, the discharge capacity density of the negative electrode active material can be increased.

While when "0.5>y", for example, the ratio occupied by nitrogen in the negative electrode active material is excessively increased as compared with the ratio occupied by oxygen. When the ratio of nitrogen is excessively increased, impurities such as lithium nitride ($Li_3N$) and the like are easily produced in addition to the crystal structure of the space group Fm3m. Thus, the discharge capacity density is decreased.

When "y≤2" is satisfied in the negative electrode active material according to the first embodiment, the discharge capacity density of the negative electrode active material can be increased.

While when "y>2", for example, the ratio of oxygen in the negative electrode active material is excessively increased. Therefore, the main reaction potential for lithium ion occlusion/release versus $Li^+/Li$ is excessively increased. Thus, the discharge capacity density is decreased.

When "z≤1.5" is satisfied in the negative electrode active material according to the first embodiment, the discharge capacity density of the negative electrode active material can be increased.

While when "z>1.5", for example, the ratio of nitrogen in the negative electrode active material is excessively increased as compared with the ratio of oxygen. When the ratio of nitrogen is excessively increased, impurities such as lithium nitride ($Li_3N$) and the like are easily produced in addition to the crystal structure of the space group Fm3m. Thus, the discharge capacity density is decreased.

When "1≤y+z" is satisfied in the negative electrode active material according to the first embodiment, the discharge capacity density of the negative electrode active material can be increased.

While when "1>y+z", for example, the number of anion species (O and N) of the negative electrode active material is excessively decreased as compared with the number of cation species (Li and Me). When the number of anion species is excessively smaller than the number of cation species, it is difficult for the crystal structure of the negative electrode active material to stably maintain the space group Fm3m. Thus, the discharge capacity density is decreased.

When "y+z≤3" is satisfied in the negative electrode active material according to the first embodiment, the discharge capacity density of the negative electrode active material can be increased.

While when "y+z>3", for example, the number of anion species (O and N) of the negative electrode active material is excessively increased as compared with the number of cation species (Li and Me). When the number of anion species is excessively larger than the number of cation species, it is difficult for the crystal structure of the negative electrode active material to stably maintain the space group Fm3m. Thus, the discharge capacity density is decreased.

The transition metal which may be contained in Me in the negative electrode active material according to the first embodiment may be Ti, V, Mn, Fe, Co, Ni, Cu, Nb, Mo, Ta, or W.

The above configuration can realize an electrochemical device (for example, a battery or a capacitor) having a higher discharge capacity density.

Also, the negative electrode active material according to the first embodiment may satisfy 0.5≤x≤4.5.

This configuration can realize an electrochemical device (for example, a battery or a capacitor) having a higher discharge capacity density.

Also, the negative electrode active material according to the first embodiment may satisfy 0.03≤z≤1.5.

This configuration can realize an electrochemical device (for example, a battery or a capacitor) having a higher discharge capacity density.

The lithium-containing transition metal oxynitride can be identified by determining the space group of the crystal structure by powder X-ray analysis. Also, the true density of the lithium-containing transition metal oxynitride can be determined by determining lattice constants.

The composition of a compound represented by the composition formula (1) can be determined by, for example, an ICP emission spectroscopy, inert-gas fusion-infrared absorption method, and an inert-gas fusion-thermal conductivity method.

<Method for Producing Negative Electrode Active Material>

A description is made below of an example of a method for producing the lithium-containing transition metal oxynitride contained in the negative electrode active material according to the first embodiment.

The lithium-containing transition metal oxynitride according to the first embodiment can be produced by, for example, a method below.

A raw material containing Li and a raw material containing a transition metal are prepared. Examples of the raw material containing Li include Li metal, oxides such as $Li_2O$, $Li_2O_2$, and the like, salts such as $Li_2CO_3$, LiOH, and the like, nitrides such as $Li_3N$ and the like, lithium-containing transition metal oxides, lithium-containing transition metal nitrides, lithium-containing transition metal oxynitrides, and the like. Examples of the raw material containing the transition metal (Me) include Me metal, oxides such as $MeO_2$, MeO, and the like, nitrides such as MeN and the like, oxynitrides such as MeON and the like, lithium-containing transition metal oxides, lithium-containing transition metal nitrides, lithium-containing transition metal oxynitrides, and the like.

These raw materials are weighed so as to obtain a predetermined molar ratio.

Thus, each of "x, y, and z" in the composition formula (1) can be changed within the range of the condition satisfied in the composition formula (1).

The lithium-containing transition metal oxynitride having the crystal structure belonging to the space group Fm3m can be produced by mixing the weighed raw materials by a dry method or a wet method and mechanochemically reacting the resultant mixture for 10 hours or more. For example, a mixing device such as a ball mill or the like can be used.

The lithium-containing transition metal oxynitride having the crystal structure substantially belonging to the space group Fm3m can be produced by adjusting the raw materials used and the mixing conditions for the raw material mixture.

As described above, the method for producing the negative electrode active material in one aspect of the first embodiment includes (a) preparing the raw materials and (b) producing the negative electrode active material by mechanochemically reacting the raw materials.

The preparation (a) may include producing a lithium-containing transition metal oxide, a lithium-containing transition metal nitride, or a lithium-containing transition metal oxynitride by a known method.

The production (b) may include mechanochemically reacting the raw materials by using a mixing device such as a ball mill or the like.

As described above, the lithium-containing transition metal oxynitride having the crystal structure belonging to the space group Fm3m can be synthesized by mechanochemically reacting precursors (for example, $Li_3N$, MeO, and the like) by using a planetary ball mill.

In this case, lithium a transition metal, oxygen, and nitrogen can be arbitrarily contained by adjusting the mixing ratio of the precursors.

On the other hand, when the precursors are reacted by a solid-phase method, the precursors are decomposed into more stable compounds.

That is, the lithium-containing transition metal oxynitride having the crystal structure belonging to the space group Fm3m cannot be produced by the method of reacting the precursors by a solid-phase method.

Second Embodiment

A second embodiment is described below. Description duplicated with the first embodiment is appropriately omitted.

A battery and a capacitor are described below as examples of the electrochemical device of the present disclosure.

A battery according to the second embodiment includes a negative electrode, a positive electrode, and an electrolyte.

The negative electrode contains the negative electrode active material (lithium-containing transition metal oxynitride) according to the first embodiment.

This configuration can realize a battery having a high discharge capacitor density.

The battery according to the second embodiment can be configured as, for example, a lithium ion secondary battery, a nonaqueous electrolyte secondary batter, an all solid secondary battery, or the like.

In the battery according to the second embodiment, the negative electrode may include a negative electrode active material layer.

The negative electrode active material layer may contain, as a main component, the negative electrode active material (lithium-containing transition metal oxynitride) according to the first embodiment. That is, the negative electrode active material layer may contain the negative electrode active material according to the first embodiment, for example, at a weight ratio of 50% or more (50% by weight or more) to the whole of the negative electrode active material layer.

This configuration can realize the battery having a higher discharge capacity density.

In the battery according to the second embodiment, the negative electrode active material layer may contain the negative electrode active material (lithium-containing transition metal oxynitride) according to the first embodiment, for example, at a weight ratio of 70% or more (70% by weight or more) to the whole of the negative electrode active material layer.

This configuration can realize the battery having a higher discharge capacity density.

The negative electrode active material layer in the battery according to the second embodiment contains the negative electrode active material as a main component and may further contain inevitable impurities or the starting raw materials used for synthesizing the negative electrode active material, by-products, and decomposition products thereof.

Also, the negative electrode active material layer in the battery according to the second embodiment may contain the negative electrode active material according to the first embodiment at a weight ratio of 100% (100% by weight) to the whole of the negative electrode active material excluding the impurities inevitably mixed.

This configuration can realize the battery having a higher discharge capacity density.

FIG. 1 is a sectional view illustrating a schematic configuration of a battery 10 as an example of the battery according to the second embodiment.

As shown in FIG. 1, the battery 10 includes a negative electrode 13, a positive electrode 16, a separator 17, and an outer casing 18.

The negative electrode 13 includes a negative electrode current collector 11 and a negative electrode mixture layer 12 (or a negative electrode active material layer) formed in contact with the upper surface of the negative electrode current collector 11.

The positive electrode 16 includes a positive electrode current collector 14 and a positive electrode mixture layer 15 (or a positive electrode active material layer) formed in contact with the upper surface of the positive electrode current collector 14.

The negative electrode 13 and the positive electrode 16 are arranged to face each other with the separator 17 disposed therebetween.

These are sealed with the outer casing 18 to form the battery 10.

The negative electrode mixture layer 12 contains the negative electrode active material according to the first embodiment.

If required, the negative electrode mixture layer 12 may contain a negative electrode active material other than the negative electrode active material according to the first embodiment, which can occlude and release lithium ions, a conductive auxiliary agent, an ionic conductor, a binder, and the like.

The conductive auxiliary agent and the ionic conductor are used for decreasing electrode resistance. Examples of the conductive auxiliary agent include carbon materials (carbon conductive auxiliary agents) such as carbon black, graphite, acetylene black, and the like, and conductive polymer compounds such as polyaniline, polypyrrole, polythiophene, and the like. Examples of the ionic conductor include gel electrolytes such as polymethyl methacrylate and the like, organic solid electrolytes such as polyethylene oxide and the like, and inorganic solid electrolytes such as $Li_7La_3Zr_2O_{12}$ and the like.

The binder is used for improving adhesion to the material constituting the electrode. Examples thereof include polyvinylidene fluoride, a vinylene fluoride-hexafluoropropylene copolymer, a vinylene fluoride-tetrafluoroethylene copolymer, polytetrafluoroethylene, carboxymethyl cellulose, polyacrylic acid, styrene-butadiene copolymer rubber, polypropylene, polyethylene, polyimide, and the like.

A porous or nonporous sheet or film made of a metal material such as stainless steel, nickel, copper, or an alloy thereof can be used as the negative electrode current collector 11. A metal foil or mesh can be used as the sheet or film. In addition, a carbon material such as carbon or the like may be applied as a conductive auxiliary agent material on the surface of the negative electrode current collector 11 in order to decrease the resistance value, impart a catalytic effect, and chemically or physically bond the negative electrode mixture layer 12 and the negative electrode current collector 11 to enhance bonding between the negative electrode mixture layer 12 and the negative electrode current collector 11.

The positive electrode mixture layer 15 contains a positive electrode active material which can occlude and release lithium ions.

If required, the positive electrode mixture layer 15 may contain the same conductive auxiliary agent, ionic conductor, and binder as in the negative electrode mixture layer 12, and the like.

A material which occludes and releases lithium ions may be used as the positive electrode active material. Examples of the positive electrode active material include lithium-containing transition metal oxides, transition metal fluorides, polyanion materials, fluorinated polyanion materials, transition metal sulfides, and the like. Among these, the lithium-containing transition metal oxides are preferably used because of low production cost and high average discharge voltage.

A porous or nonporous sheet or film made of a metal material such as aluminum, stainless steel, titanium, or an alloy thereof can be used as the positive electrode current collector 14. Among these, aluminum or an alloy thereof is preferred in view of low cost and easy formation of a thin film. A metal foil or mesh can be used as the sheet or film. In addition, a carbon material such as carbon or the like may be applied on the surface of the positive electrode current collector 14 in order to decrease the resistance value, impart a catalytic effect, and enhance bonding between the positive electrode mixture layer 15 and the positive electrode current collector 14 by chemically or physically bonding the positive electrode mixture layer 15 and the positive electrode current collector 14.

The electrolyte used in the second embodiment may be a nonaqueous electrolyte. Examples of the electrolyte which can be used in the embodiment include an electrolytic solution containing a lithium salt and a nonaqueous solvent, a gel electrolyte, a solid electrolyte, and the like.

Usable examples of the lithium salt include lithium hexafluorophosphate ($LiPF_6$), lithium tetrafluoroborate ($LiBF_4$), lithium perchlorate ($LiClO_4$), bistrifluoromethyl sulfonylimide lithium ($LiN(SO_2CF_3)_2$), bisperfluoroethyl sulfonylimide lithium ($LiN(SO_2C_2F_5)_2$), bisfluoromethyl sulfonyimide lithium ($LiN(SO_2F)_2$), $LiAsF_6$, $LiCF_3SO_3$, lithium difluoro(oxalate)borate, and the like. Among these, $LiPF_6$ is preferably used in view of battery safety, thermal stability, and ion conductivity. The electrolyte salts may be used alone or in combination of two or more.

Usable examples of the nonaqueous solvent include nonaqueous solvents which are generally used for batteries, such as cyclic carbonate esters, linear carbonate esters, esters, cyclic ethers, linear ethers, nitriles, amides, and the like. These solvents may be used alone or in combination of two or more.

Usable examples of the cyclic carbonate esters include ethylene carbonate, propylene carbonate, butylene carbonate, and the like. These esters in each of which the hydrocarbon group is partially or entirely fluorinated can be used. Examples thereof include trifluoropropylene carbonate, fluoroethyl carbonate, and the like.

Examples of the linear carbonate esters include dimethyl carbonate, ethylmethyl carbonate, diethyl carbonate, methylpropyl carbonate, ethylpropyl carbonate, methylisopropyl carbonate, and the like. These esters in each of which the hydrocarbon group is partially or entirely fluorinated can be used.

Examples of esters include methyl acetate, ethyl acetate, propyl acetate, methyl propionate, ethyl propionate, γ-butyrolactone, and the like.

Examples of cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, crown ether, and the like.

Examples of the linear ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl ether, and the like.

Examples of the nitriles include acetonitrile and the like.
Examples of the amides include dimethylformamide and the like.

Examples of the solid electrolyte include an organic polymer solid electrolyte, an oxide solid electrolyte, a sulfide solid electrolyte, and the like.

For example, a compound of a polymer compound with a lithium salt can be used as the organic polymer solid electrolyte.

The polymer compound may have an ethylene oxide structure. Having an ethylene oxide structure can increase the content of a lithium salt and further increase ionic conductivity.

Examples of the oxide solid electrolyte include NASICON-type solid electrolytes such as $LiTi_2(PO_4)_3$ and element-substituted derivatives thereof, $(LaLi)TiO_3$-based perovskite-type solid electrolyte, LISICON-type solid electrolytes such as $Li_{14}ZnGe_4O_{16}$, $Li_4SiO_4$, $LiGeO_4$, and element-substituted derivatives thereof, garnet-type solid electrolytes such as $Li_7La_3Zr_2O_{12}$ and element-substituted derivatives thereof, $Li_3N$ and H-substituted derivatives thereof, $Li_3PO_4$ and N-substituted derivatives thereof, and the like.

Usable examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, $Li_{10}GeP_2S_{12}$, and the like. In addition, LiX (X: F, Cl, Br, or I), $MO_p$, or $Li_qMO_p$ (M: any one of P, Si, Ge, B, Al, Ga, and In) (p, q: natural number) may be added to these sulfide solid electrolytes.

Among these, particularly, the sulfide solid electrolyte is rich in moldability and has high ionic conductivity. Therefore, the battery having a higher energy density can be realized by using the sulfide solid electrolyte as the solid electrolyte.

Among the sulfide solid electrolytes, $Li_2S$—$P_2S_5$ has high electrochemical stability and higher ionic conductivity. Thus, the battery having a higher energy density can be realized by using $Li_2S$—$P_2S_5$ as the solid electrolyte.

The battery according to the second embodiment can be configured as a battery having any one of various shapes such as a coin shape, a cylindrical shape, a square shape, a sheet shape, a button shape, a flat shape, a laminated shape, and the like.

The electrochemical device of the present disclosure may be a capacitor (for example, a lithium ion capacitor). That is, the negative electrode active material described in the first embodiment may be used as a negative electrode material of the lithium ion capacitor. Thus, the lithium ion capacitor including a negative electrode containing the negative electrode active material described in the first embodiment is configured. This configuration can realize an increase in capacity of the lithium ion capacitor.

The lithium ion capacitor of the present disclosure may be configured to include a positive electrode containing a carbon material (activated carbon or the like). In this case, the positive electrode may be configured to cause adsorption and desorption of an electrolytic solution anion (for example, $PF_6^-$ or the like) on and from the carbon material.

EXAMPLES

Examples described below are merely examples, and the present disclosure is not limited to these examples.

Example 1

[Production of Negative Electrode Active Material]

A negative electrode active material was produced by preparing raw materials and mechanochemically reacting the raw materials.

First, preparation of raw materials is described. The preparation of raw materials produced niobium oxynitride ($NbO_{1.1}N_{0.9}$) having a vaterite (space group P121/c1) structure by using a known method. That is, $Nb_2O_5$ was fired at 700° C. for 12 hours in an ammonia atmosphere. This produced the corresponding transition metal oxynitride ($NbO_{1.1}N_{0.9}$).

Next, the mechanochemical reaction of the raw materials is described. A Li metal and $NbO_{1.1}N_{0.9}$ were weighed at a molar ratio of $Li/NbO_{1.1}N_{0.9}=1.0/1.0$ in a glove box in an Ar atmosphere with an oxygen value of 1 ppm or less. The resultant raw material was placed, together with a proper amount of zirconia balls of 3 mm in diameter, in a 45-cc zirconia vessel and sealed in the glove box in an Ar atmosphere with an oxygen value of 1 ppm or less and a dew point of −60° C. or less. The vessel was taken out from the glove box and treated at 600 rpm for 30 hours by using a planetary ball mill.

The resultant negative electrode active material (lithium-containing transition metal oxynitride) was measured by powder X-ray diffraction.

Figure 2:
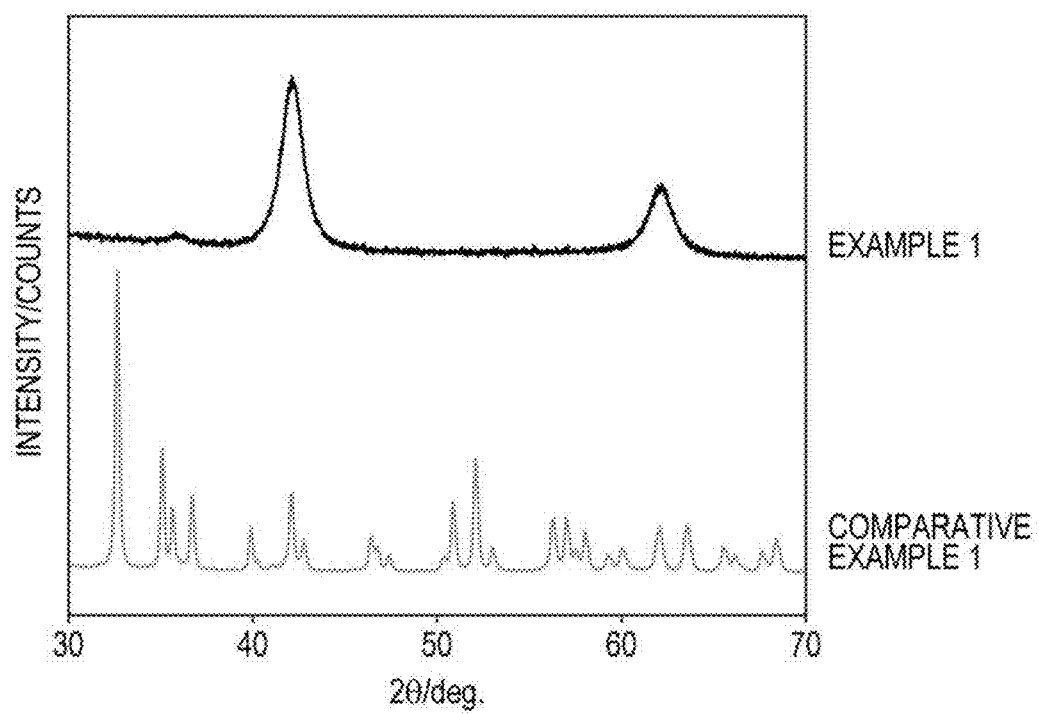
FIG. 2 is a diagram showing the results of powder X-ray diffraction measurement.

The results of measurement are shown in FIG. 2.

The space group of the resultant negative electrode active material was Fm3m.

The composition of the resultant negative electrode active material was determined by an ICP emission spectroscopy, an inert-gas fusion-infrared absorption method, and an inert-gas fusion-thermal conductivity method.

As a result, the composition of the resultant negative electrode active material was $LiNbO_{1.1}N_{0.9}$.

[Formation of Test Electrode]

The resultant negative electrode active material, acetylene black as a conductive auxiliary agent, and polyvinylidene fluoride as a binder were weighed at a weight ratio of 7:2:1 in a glove box in an Ar atmosphere with an oxygen value of 1 ppm or less.

These materials were dispersed in NMP solvent to prepare a slurry.

The prepared slurry was applied on a Cu current collector by using a coating machine.

The coated electrode plate was rolled by using a rolling machine and a 20-mm square was punched out.

The punched electrode plate was processed to an electrode state, thereby forming a test electrode of Example 1.

[Formation of Cell for Evaluation]

A lithium secondary battery (cell for evaluation) using lithium metal for a counter electrode and a reference electrode was formed by using the test electrode.

The preparation of an electrolytic solution and formation of the cell for evaluation were performed in a glove box in an Ar atmosphere with a dew point of −60° C. or less and an oxygen value of 1 ppm or less.

A solution prepared by dissolving lithium hexafluorophosphate ($LiPF_6$) at a concentration of 1 mole in a mixed solvent of ethylene carbonate and ethylmethyl carbonate at a volume ratio of 1:3 was used as the electrolytic solution.

Also, lithium metal was soldered to a nickel mesh of a 20-mm square. The nickel mesh was used as the counter electrode.

The test electrode and the counter electrode were opposed to each other with a separator disposed therebetween and made of a polyethylene microporous film impregnated with the electrolytic solution. In this state, both electrodes were housed in an outer casing, which was then sealed.

As a result, the cell for evaluation of Example 1 was formed.

[Charge-Discharge Test]

The charge-discharge characteristics of the cell for evaluation were evaluated by a charge-discharge test. The method and results are described below.

The charge-discharge test of the cell for evaluation was performed in a content-temperature bath of 25° C.

In the charge-discharge test, the test electrode containing the negative electrode active material was charged and then discharged with a pause of 20 minutes between charging and discharging.

The initial discharge capacity (charge-discharge characteristic) was evaluated by the following method.

Charging (Li ion occlusion) was performed at a constant current of 8.75 mA per weight of the negative electrode active material until a potential difference from the reference electrode reached 0 V.

Then, discharging (Li ion release) was performed at a constant current of 8.75 mA per weight of the negative electrode active material until I a potential difference from the reference electrode reached 2 V to examine the initial discharge capacity.

The discharge capacity of the negative electrode active material of Example 1 was determined by multiplying the initial discharge capacity per weight of the negative electrode active material by the true density of the active material. The discharge capacity of the negative electrode active material of Example 1 was 2054 mAh/cc.

Example 2

In preparing raw materials, $Li_3N$ and NbO were weighed at a molar ratio of $Li_3N/NbO=1.0/2.0$.

Excepting this, the same method as in Example 1 was used or producing a negative electrode active material of Example 2.

The space group of the resultant negative electrode active material of Example 2 was Fm3m.

The composition of the resultant negative electrode active material of Example 2 was $Li_{1.5}NbON_{0.5}$.

A test electrode and a cell for evaluation were produced by the same method as in Example 1 and charge-discharge characteristics were evaluated.

The initial discharge capacity of the negative electrode active material of Example 2 was 1705 mAh/cc.

Example 3

In preparing raw materials, $Li_3N$ and NbO were weighed at a molar ratio of $Li_3N/NbO=1.0/1.0$.

Excepting this, the same method as in Example 1 was used for producing a negative electrode active material of Example 3.

The space group of the resultant negative electrode active material of Example 3 was Fm3m.

The composition of the resultant negative electrode active material of Example 3 was $Li_3NbON$.

A test electrode and a cell for evaluation were produced by the same method as in Example 1 and charge-discharge characteristics were evaluated.

The initial discharge capacity of the negative electrode active material of Example 3 was 1437 mAh/cc.

Example 4

In preparing raw materials, $Li_3N$ and NbO were weighed at a molar ratio of $Li_3N$/NbO=1.5/1.0.

Excepting this, the same method as in Example 1 was used for producing a negative electrode active material of Example 4.

The space group of the resultant negative electrode active material of Example 4 was Fm3m.

The composition of the resultant negative electrode active material of Example 4 was $Li_{4.5}NbON_{1.5}$.

A test electrode and a cell for evaluation were produced by the same method as in Example 1 and charge-discharge characteristics were evaluated.

The initial discharge capacity of the negative electrode active material of Example 4 was 967 mAh/cc.

Example 5

In preparing raw materials, tantalum oxynitride (TaON) having a vaterite (space group P121/c1) structure was produced by using a known method. That is, $Ta_2O_5$ was fired at 850° C. for 12 hours in an ammonia atmosphere. This produced the corresponding transition metal oxynitride (TaON).

In mechanochemically reacting the raw materials, Li metal and TaON were weighed at a molar ratio of Li/TaON=1.0/1.0 in a glove box in an Ar atmosphere with an oxygen value of 1 ppm or less.

Excepting this, the same method as in Example 1 was used for producing a negative electrode active material of Example 5.

The space group of the resultant negative electrode active material of Example 5 was Fm3m.

The composition of the resultant negative electrode active material of Example 5 was LiTaON.

A test electrode and a cell for evaluation were produced by the same method as in Example 1 and charge-discharge characteristics were evaluated.

The initial discharge capacity of the negative electrode active material of Example 5 was 3032 mAh/cc.

Example 6

In preparing raw materials, lithium titanium oxynitride ($Li_{0.67}TiO_2N_{0.3}$) having a ramsdellite (space group P121/m1) structure was produced by using a known method. That is, $Li_{0.67}TiO_{2.3}$ was fired at 600° C. for 12 hours in an ammonia atmosphere. This produced the corresponding lithium transition metal oxynitride ($Li_{0.67}TiO_2N_{0.3}$).

Excepting this, the same method as in Example 1 was used for producing a negative electrode active material of Example 6. That is, the same mechanochemical reaction as in Example 1 was performed by using the resultant $Li_{0.67}TiO_2N_{0.3}$ as a raw material.

The space group of the resultant negative electrode active material of Example 6 was Fm3m.

The composition of the resultant negative electrode active material of Example 6 was $Li_{0.67}TiO_2N_{0.3}$.

A test electrode and a cell for evaluation were produced by the same method as in Example 1 and charge-discharge characteristics were evaluated.

The initial discharge capacity of the negative electrode active material of Example 6 was 887 mAh/cc.

Example 7

In preparing raw materials, $Li_3N$ and $Li_{0.67}TiO_{2.3}$ were weighed at a molar ratio of $Li_3N/Li_{0.67}TiO_{2.3}$=3.0/100.0.

Excepting this, the same method as in Example 1 was used for producing a negative electrode active material of Example 7.

The space group of the resultant negative electrode active material of Example 7 was Fm3m.

The composition of the resultant negative electrode active material of Example 7 was $Li_{0.76}TiO_2N_{0.03}$.

A test electrode and a cell for evaluation were produced by the same method as in Example 1 and charge-discharge characteristics were evaluated.

The initial discharge capacity of the negative electrode active material of Example 7 was 855 mAh/cc.

Example 8

In preparing raw materials, $Li_3N$ and $TiO_2$ were weighed at a molar ratio of $Li_3N/TiO_2$=1.0/2.0.

Excepting this, the same method as in Example 1 was used for producing a negative electrode active material of Example 8.

The space group of the resultant negative electrode active material of Example 8 was Fm3m.

The composition of the resultant negative electrode active material of Example 8 was $Li_{1.5}TiO_2N_{0.5}$.

A test electrode and a cell for evaluation were produced by the same method as in Example 1 and charge-discharge characteristics were evaluated.

The initial discharge capacity of the negative electrode active material of Example 8 was 836 mAh/cc.

Example 9

In preparing raw materials, $Li_3N$ and $TiO_2$ were weighed at a molar ratio of $Li_3N/TiO_2$=1.0/1.0.

Excepting this, the same method as in Example 1 was used for producing a negative electrode active material of Example 9.

The space group of the resultant negative electrode active material of Example 9 was Fm3m.

The composition of the resultant negative electrode active material of Example 9 was $Li_3TiO_2N$.

A test electrode and a cell for evaluation were produced by the same method as in Example 1 and charge-discharge characteristics were evaluated.

The initial discharge capacity of the negative electrode active material of Example 9 was 792 mAh/cc.

Example 10

In preparing raw materials, $Li_3N$ and MnO were weighed at a molar ratio of $Li_3N$/MnO=1.0/2.0.

Excepting this, the same method as in Example 1 was used for producing a negative electrode active material of Example 10.

The space group of the resultant negative electrode active material of Example 10 was Fm3m.

The composition of the resultant negative electrode active material of Example 10 was $Li_{1.5}MnON_{0.5}$.

A test electrode and a cell for evaluation were produced by the same method as in Example 1 and charge-discharge characteristics were evaluated.

The initial discharge capacity of the negative electrode active material of Example 10 was 1325 mAh/cc.

Example 11

In preparing raw materials, $Li_3N$ and MnO were weighed at a molar ratio of $Li_3N/Mn/MnO=1.0/1.0/1.0$.

Excepting this, the same method as in Example 1 was used for producing a negative electrode active material of Example 11.

The space group of the resultant negative electrode active material of Example 11 was Fm3m.

The composition of the resultant negative electrode active material of Example 11 was $Li_{1.5}MnO_{0.5}N_{0.5}$.

A test electrode and a cell for evaluation were produced by the same method as in Example 1 and charge-discharge characteristics were evaluated.

The initial discharge capacity of the negative electrode active material of Example 11 was 1205 mAh/cc.

Example 12

In preparing raw materials, $Li_3N$ and $Mn_2O_3$ were weighed at a molar ratio of $Li_3N/Mn_2O_3=1.0/2.0$.

Excepting this, the same method as in Example 1 was used for producing a negative electrode active material of Example 12.

The space group of the resultant negative electrode active material of Example 12 was Fm3m.

The composition of the resultant negative electrode active material of Example 12 was $Li_{0.75}MnO_{1.5}N_{0.25}$.

A test electrode and a cell for evaluation were produced by the same method as in Example 1 and charge-discharge characteristics were evaluated.

The initial discharge capacity of the negative electrode active material of Example 12 was 1314 mAh/cc.

Example 13

In preparing raw materials, $Li_3N$ and $Mn_3O_4$ were weighed at a molar ratio of $Li_3N/Mn_3O_4=1.0/2.0$.

Excepting this, the same method as in Example 1 was used for producing a negative electrode active material of Example 13.

The space group of the resultant negative electrode active material of Example 13 was Fm3m.

The composition of the resultant negative electrode active material of Example 13 was $Li_{0.5}MnO_{1.3}N_{0.17}$.

A test electrode and a cell for evaluation were produced by the same method as in Example 1 and charge-discharge characteristics were evaluated.

The initial discharge capacity of the negative electrode active material of Example 13 was 1223 mAh/cc.

Example 14

In preparing raw materials, $Li_3N$ and $V_2O_3$ were weighed at a molar ratio of $Li_3N/V_2O_3=1.0/2.0$.

Excepting this, the same method as in Example 1 was used for producing a negative electrode active material of Example 14.

The space group of the resultant negative electrode active material of Example 14 was Fm3m.

The composition of the resultant negative electrode active material of Example 14 was $Li_{0.75}VO_{1.5}N_{0.25}$.

A test electrode and a cell for evaluation were produced by the same method as in Example 1 and charge-discharge characteristics were evaluated.

The initial discharge capacity of the negative electrode active material of Example 14 was 836 mAh/cc.

Example 15

In preparing raw materials, $Li_3N$ and FeO were weighed at a molar ratio of $Li_3N/FeO=1.0/2.0$.

Excepting this, the same method as in Example 1 was used for producing a negative electrode active material of Example 15.

The space group of the resultant negative electrode active material of Example 15 was Fm3m.

The composition of the resultant negative electrode active material of Example 15 was $Li_{1.5}FeON_{0.5}$.

A test electrode and a cell for evaluation were produced by the same method as in Example 1 and charge-discharge characteristics were evaluated.

The initial discharge capacity of the negative electrode active material of Example 15 was 1338 mAh/cc.

Example 16

In preparing raw materials, $Li_3N$ and CoO were weighed at a molar ratio of $Li_3N/CoO=1.0/2.0$.

Excepting this, the same method as in Example 1 was used for producing a negative electrode active material of Example 16.

The space group of the resultant negative electrode active material of Example 16 was Fm3m.

The composition of the resultant negative electrode active material of Example 16 was $Li_{1.5}CoON_{0.5}$.

A test electrode and a cell for evaluation were produced by the same method as in Example 1 and charge-discharge characteristics were evaluated.

The initial discharge capacity of the negative electrode active material of Example 16 was 1385 mAh/cc.

Example 17

In preparing raw materials, $Li_3N$ and NiO were weighed at a molar ratio of $Li_3N/NiO=1.0/2.0$.

Excepting this, the same method as in Example 1 was used for producing a negative electrode active material of Example 17.

The space group of the resultant negative electrode active material of Example 17 was Fm3m.

The composition of the resultant negative electrode active material of Example 17 was $Li_{1.5}NiON_{0.5}$.

A test electrode and a cell for evaluation were produced by the same method as in Example 1 and charge-discharge characteristics were evaluated.

The initial discharge capacity of the negative electrode active material of Example 17 was 1381 mAh/cc.

Example 18

In preparing raw materials, $Li_3N$ and CuO were weighed at a molar ratio of $Li_3N/CuO=1.0/2.0$.

Excepting this, the same method as in Example 1 was used for producing a negative electrode active material of Example 18.

The space group of the resultant negative electrode active material of Example 18 was Fm3m.

The composition of the resultant negative electrode active material of Example 18 was $Li_{1.5}CuON_{0.5}$.

A test electrode and a cell for evaluation were produced by the same method as in Example 1 and charge-discharge characteristics were evaluated.

The initial discharge capacity of the negative electrode active material of Example 18 was 1454 mAh/cc.

Example 19

In preparing raw materials, $Li_3N$ and $MoO_2$ were weighed at a molar ratio of $Li_3N/MoO_2=1.0/2.0$.

Excepting this, the same method as in Example 1 was used for producing a negative electrode active material of Example 19.

The space group of the resultant negative electrode active material of Example 19 was Fm3m.

The composition of the resultant negative electrode active material of Example 19 was $Li_{1.5}MoO_2N_{0.5}$.

A test electrode and a cell for evaluation were produced by the same method as in Example 1 and charge-discharge characteristics were evaluated.

The initial discharge capacity of the negative electrode active material of Example 19 was 970 mAh/cc.

Example 20

In preparing raw materials, $Li_3N$ and $WO_2$ were weighed at a molar ratio of $Li_3N/WO_2=1.0/2.0$.

Excepting this, the same method as in Example 1 was used for producing a negative electrode active material of Example 20.

The space group of the resultant negative electrode active material of Example 20 was Fm3m.

The composition of the resultant negative electrode active material of Example 20 was $Li_{1.5}WO_2N_{0.5}$.

A test electrode and a cell for evaluation were produced by the same method as in Example 1 and charge-discharge characteristics were evaluated.

The initial discharge capacity of the negative electrode active material of Example 20 was 1166 mAh/cc.

Comparative Example 1

Niobium oxynitride ($NbO_{1.1}N_{0.9}$) having a vaterite (space group P121/c1) structure produced by a known method was used as a negative electrode active material of Comparative Example 1. That is, $Nb_2O_5$ was fired at 700° C. for 12 hours in an ammonia atmosphere. This produced the negative electrode active material ($NbO_{1.1}N_{0.9}$) of Comparative Example 1.

The resultant negative electrode active material of Comparative Example 1 was measured by powder X-ray diffraction.

The results of measurement are shown in FIG. 2.

The space group of the resultant negative electrode active material of Comparative Example 1 was P121/c1.

The composition of the resultant negative electrode active material of Comparative Example 1 was $NbO_{1.1}N_{0.9}$.

A test electrode and a cell for evaluation were produced by the same method as in Example 1 and charge-discharge characteristics were evaluated.

The initial discharge capacity of the negative electrode active material of Comparative Example 1 was 183 mAh/cc.

Comparative Example 2

Tantalum oxynitride (TaON) having a vaterite (space group P121/c1) structure produced by a known method was used as a negative electrode active material of Comparative Example 2. That is, $Ta_2O_5$ was fired at 850° C. for 12 hours in an ammonia atmosphere. This produced the negative electrode active material (TaON) of Comparative Example 2.

The space group of the resultant negative electrode active material of Comparative Example 2 was P121/c1.

The composition of the resultant negative electrode active material of Comparative Example 2 was TaON.

A test electrode and a cell for evaluation were produced by the same method as in Example 1 and charge-discharge characteristics were evaluated.

The initial discharge capacity of the negative electrode active material of Comparative Example 2 was 711 mAh/cc.

Comparative Example 3

Lithium titanium oxide ($Li_{0.67}TiO_{2.3}$) having a ramsdellite (space group P121/m1) structure was used as a negative electrode active material of Comparative Example 3.

The space group of the resultant negative electrode active material of Comparative Example 3 was P121/m1.

The composition of the resultant negative electrode active material of Comparative Example 3 was $Li_{0.67}TiO_{2.3}$.

A test electrode and a cell for evaluation were produced by the same method as in Example 1 and charge-discharge characteristics were evaluated.

The initial discharge capacity of the negative electrode active material of Comparative Example 3 was 446 mAh/cc.

Comparative Example 4

Lithium titanium oxynitride ($Li_{0.67}TiO_2N_{0.3}$) having a ramsdellite (space group P121/m1) structure produced by a known method was used as a negative electrode active material of Comparative Example 4. That is, $Li_{0.67}TiO_{2.3}$ was fired at 600° C. for 12 hours in an ammonia atmosphere. This produced the negative electrode active material ($Li_{0.67}TiO_2N_{0.3}$) of Comparative Example 4.

The space group of the resultant negative electrode active material of Comparative Example 4 was P121/m1.

The composition of the resultant negative electrode active material of Comparative Example 4 was $Li_{0.67}TiO_2N_{0.3}$.

A test electrode and a cell for evaluation were produced by the same method as in Example 1 and charge-discharge characteristics were evaluated.

The initial discharge capacity of the negative electrode active material of Comparative Example 4 was 480 mAh/cc.

The above results are shown in Table 1 below.

TABLE 1

| | Composition | y + z | Space group | Discharge capacity per active material (mAh/cc) |
|---|---|---|---|---|
| Example 1 | $LiNbO_{1.1}N_{0.9}$ | 2.0 | Fm3m | 2054 |
| Example 2 | $Li_{1.5}NbON_{0.5}$ | 1.5 | Fm3m | 1705 |
| Example 3 | $Li_3NbON$ | 2.0 | Fm3m | 1437 |
| Example 4 | $Li_{4.5}NbON_{1.5}$ | 2.5 | Fm3m | 967 |
| Example 5 | $LiTaON$ | 2.0 | Fm3m | 3032 |

TABLE 1-continued

| | Composition | y + z | Space group | Discharge capacity per active material (mAh/cc) |
|---|---|---|---|---|
| Example 6 | $Li_{0.67}TiO_2N_{0.3}$ | 2.3 | Fm3m | 887 |
| Example 7 | $Li_{0.76}TiO_2N_{0.03}$ | 2.03 | Fm3m | 855 |
| Example 8 | $Li_{1.5}TiO_2N_{0.5}$ | 2.5 | Fm3m | 836 |
| Example 9 | $Li_3TiO_2N$ | 3.0 | Fm3m | 792 |
| Example 10 | $Li_{1.5}MnON_{0.5}$ | 1.5 | Fm3m | 1325 |
| Example 11 | $Li_{1.5}MnO_{0.5}N_{0.5}$ | 1.0 | Fm3m | 1205 |
| Example 12 | $Li_{0.75}MnO_{1.5}N_{0.25}$ | 1.75 | Fm3m | 1314 |
| Example 13 | $Li_{0.5}MnO_{1.3}N_{0.17}$ | 1.47 | Fm3m | 1223 |
| Example 14 | $Li_{0.75}VO_{1.5}N_{0.25}$ | 1.75 | Fm3m | 836 |
| Example 15 | $Li_{1.5}FeON_{0.5}$ | 1.5 | Fm3m | 1338 |
| Example 16 | $Li_{1.5}CoON_{0.5}$ | 1.5 | Fm3m | 1385 |
| Example 17 | $Li_{1.5}NiON_{0.5}$ | 1.5 | Fm3m | 1381 |
| Example 18 | $Li_{1.5}CuON_{0.5}$ | 1.5 | Fm3m | 1454 |
| Example 19 | $Li_{1.5}MoO_2N_{0.5}$ | 2.5 | Fm3m | 970 |
| Example 20 | $Li_{1.5}WO_2N_{0.5}$ | 2.5 | Fm3m | 1166 |
| Comparative Example 1 | $NbO_{1.1}N_{0.9}$ | — | P121/c1 | 183 |
| Comparative Example 2 | TaON | — | P121/c1 | 711 |
| Comparative Example 3 | $Li_{0.67}TiO_{2.3}$ | — | P121/m1 | 446 |
| Comparative Example 4 | $Li_{0.67}TiO_2N_{0.3}$ | 2.3 | P121/m1 | 480 |

[Consideration]

The lithium-containing transition metal oxynitrides of Examples 1, 5, and 6 have an initial discharge capacity of 887 to 3032 mAh/cc.

That is, the initial discharge capacities of the negative electrode active materials of Examples 1, 5, and 6 are higher than those of the negative electrode active materials of Comparative Examples 1 to 4, which are compounds (oxynitride, lithium-containing oxide, and lithium-containing oxynitride) having a vaterite (space group P121/c1) structure or ramsdellite (space group P121/m1) structure.

The conceivable reason for this is that in Examples 1, 5, and 6, the initial discharge capacity is increased by using the lithium-containing transition metal oxynitride with the space group Fm3m as the negative electrode active material.

The initial discharge capacities of the negative electrode active materials of Examples 1 to 20 are higher than that (791 mAh/cc) of a graphite-based carbon material used as a general negative electrode active material.

The above results indicate that the initial discharge capacity can be more increased by using the lithium-containing transition metal oxynitride having a crystal structure belonging to the space group Fm3m as the negative electrode active material.

The negative electrode active material of the present disclosure can be preferably used as a negative electrode active material of a battery such as a secondary battery or the like.

What is claimed is:

1. A negative electrode active material comprising a lithium-containing transition metal oxynitride having a crystal structure belonging to the space group Fm3m.

2. The negative electrode active material according to claim 1, wherein the lithium-containing transition metal oxynitride is a compound represented by the following composition formula (1):

$$Li_xMeO_yN_z \quad \text{Formula (1)}$$

wherein Me is at least one metal selected from the group consisting of transition metals, and the following conditions are satisfied $0 < x \leq 7$ $0.5 \leq y \leq 2$ $0 < z \leq 1.5$ $1 \leq y+z \leq 3$.

3. The negative electrode active material according to claim 2, wherein the transition metals are Ti, V, Mn, Fe, Co, Ni, Cu, Nb, Mo, Ta, and W.

4. The negative electrode active material according to claim 2, wherein $0.5 \leq x \leq 4.5$ is satisfied.

5. The negative electrode active material according to claim 2, wherein $0.03 \leq z \leq 1.5$ is satisfied.

6. An electrochemical device comprising:
a negative electrode containing the negative electrode active material according to claim 1;
a positive electrode; and
an electrolyte.

7. The electrochemical device according to claim 6, wherein the negative electrode includes a negative electrode active material layer containing the negative electrode active material as a main component.

* * * * *